July 6, 1948.　　　　N. A. KATH　　　　2,444,512
OPTICAL FILTER ATTACHMENT
Filed Nov. 20, 1946　　　　2 Sheets-Sheet 1
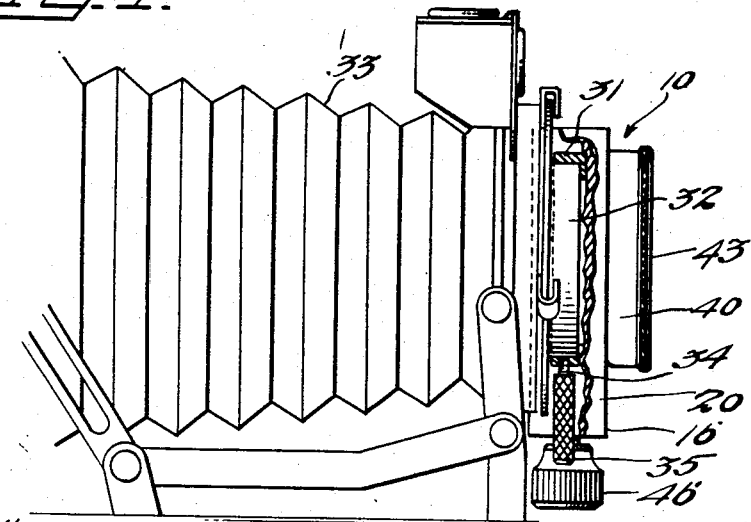
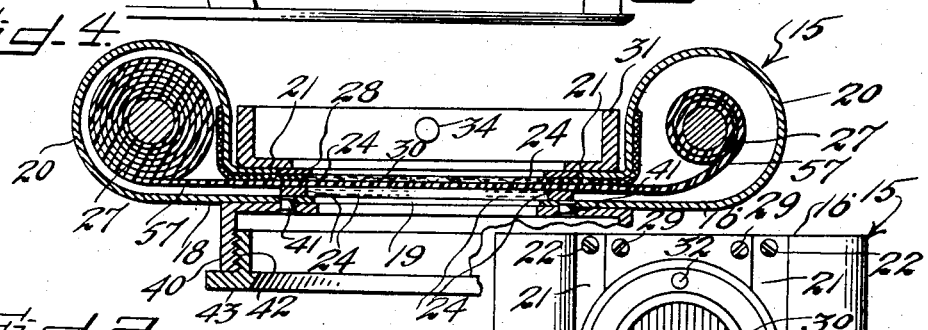
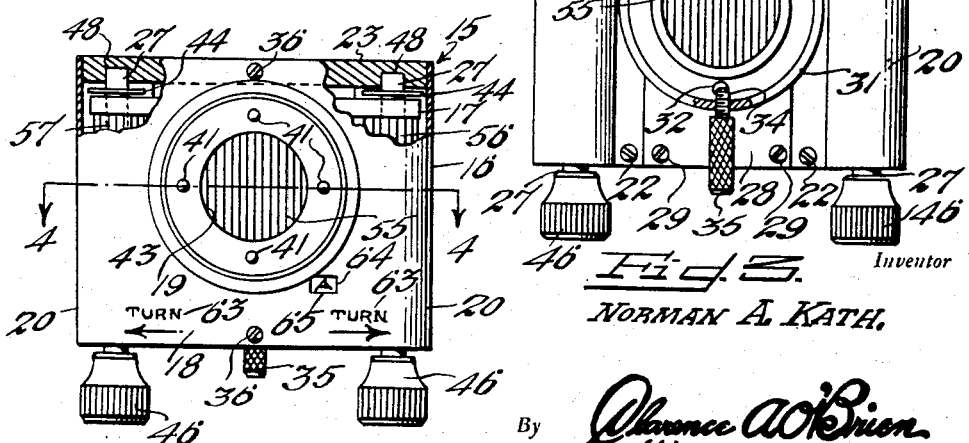
Inventor
NORMAN A. KATH.
By Clarence A. O'Brien
and Harvey B. Jacobson
Attorneys July 6, 1948.　　　　　N. A. KATH　　　　　2,444,512
OPTICAL FILTER ATTACHMENT
Filed Nov. 20, 1946　　　　　　　　　　　2 Sheets-Sheet 2
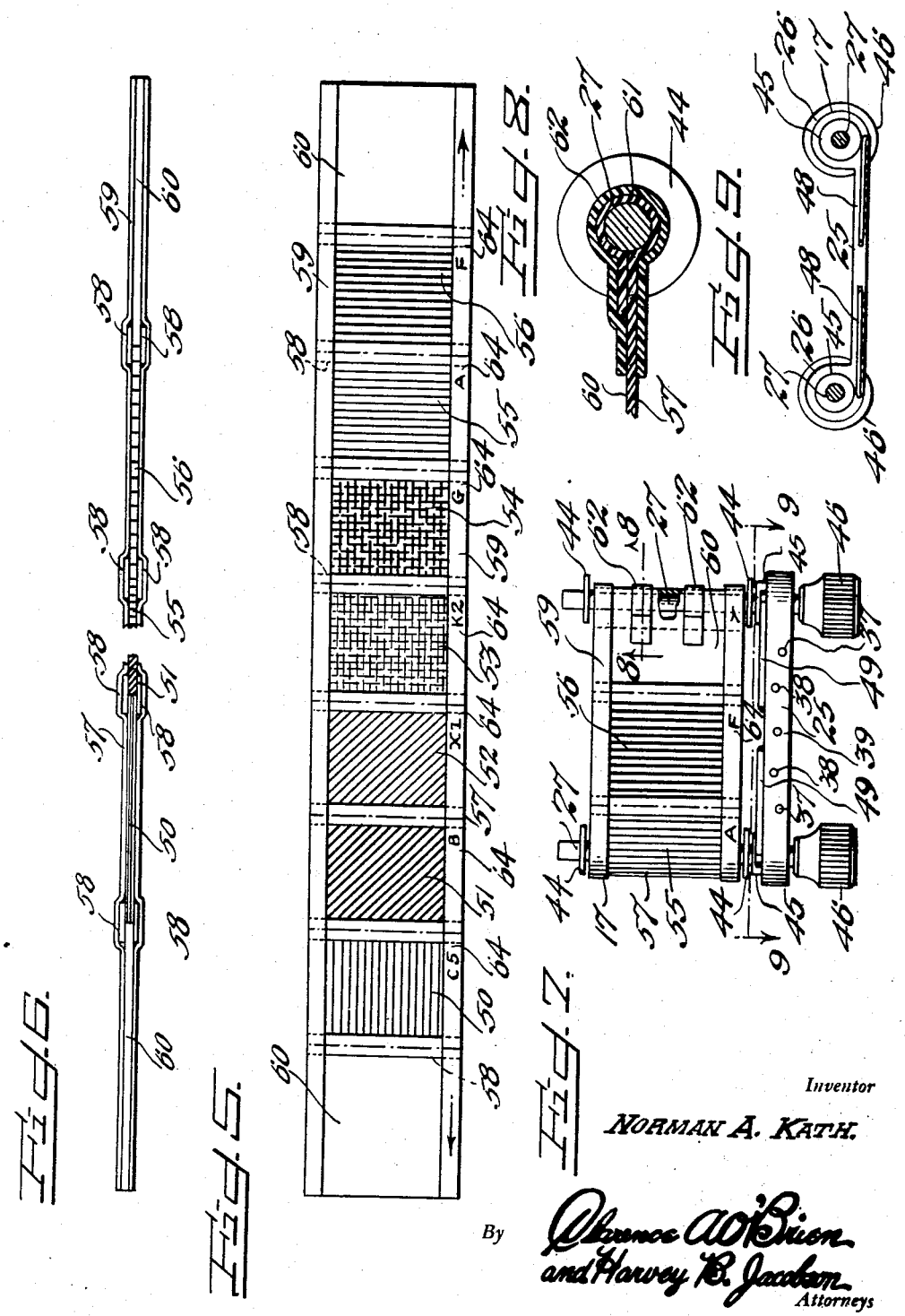
Inventor
NORMAN A. KATH.
By
Attorneys Patented July 6, 1948

2,444,512

UNITED STATES PATENT OFFICE 2,444,512

OPTICAL FILTER ATTACHMENT

Norman A. Kath, Davenport, Iowa

Application November 20, 1946, Serial No. 711,017

1 Claim. (Cl. 95—81.5)

This invention relates to new and useful improvements and structural refinements in optical filter attachments, more specifically, in filter attachments such as may be effectively employed in association with various optical instruments such cameras, projectors, spotlights, or the like, and the principal object of the invention is to provide a device of the character herein described, wherein a plurality of differently colored filters are readily available for selective positioning before the objective of the instrument.

Conventional devices employed for this purpose usually assume the form of a plurality of independent filters stored in a suitable cabinet, the appropriate filter being selected and applied to the objective, as required. The resultant inconvenience of individually selecting and applying each filter can be readily appreciated, and the added burden of transporting the filter cabinet together with the optical instrument cannot be overlooked.

It is, therefore, a further object of the invention to eliminate the above disadvantages by providing an attachment which, as aforesaid, includes the various, differently colored filters in its construction, and which, as a whole, may be readily applied to and removed from the objective.

Another object of the invention is to provide an optical filter attachment which includes means for identifying the particular filter positioned in front of the objective and in which the various filters may be easily and conveniently interchanged.

An additional object of the invention is to provide an optical filter attachment which is simple in construction and operation, and which will not easily become damaged.

A still further object of the invention is to provide an optical filter attachment which will readily lend itself to economical manufacture and which is otherwise well adapted for the purpose for which it is intended.

With the above more important objects in view, and such other objects as may become apparent as this specification proceeds, the invention consists essentially of the arrangement and construction of parts as illustrated in the accompanying drawings, in which:

Figure 1 is a side elevation of a photographic camera, showing the invention in situ thereon, the invention being partially broken away to reveal its construction.

Figure 2 is a front elevation of the invention per se.

Figure 3 is a rear elevation thereof.

Figure 4 is a cross sectional view, taken substantially in the plane of the line 4—4 in Figure 2.

Figure 5 is a developed plane view of the strip of filters used in the invention.

Figure 6 is an enlarged, partially broken away side elevation of the subject shown in Figure 5.

Figure 7 is a front elevation of a spool carrier used in the invention.

Figure 8 is a cross sectional view, take substantially in the plane of the line 8—8 in Figure 7, and Figure 9 is a cross sectional view, taken substantially in the plane of the line 9—9 in Figure 7.

Like characters of reference are used to designate like parts in the specification and throughout the several views.

Referring now to the accompanying drawings in detail, the invention consists of an optical filter attachment designated generally by the reference character 15, the same embodying in its construction a holder 16 and a removable spool carrier 17.

The holder 16 includes a substantially flat plate 18, the mid-portion of which is provided with a sight opening 19, hereinafter more fully described. The end portions of the plate 18 are arcuated to provide a pair of substantially cylindrical sleeves 20 at the relatively opposite sides of the opening 19, the free extremities 21 of the sleeves 20 being spaced with respect to the intermediate portion of the plate 18, but being secured thereto by a plurality of suitable screws 22.

The spacing of the extreme portions 21 of the sleeves 20 with respect to the mid-portion of the plate 18 is facilitated by the provision of an end plate 23, the same consisting of a flat strip interposed between the portions 21 and the plate, while the end portions of said strip are enlarged to form substantially circular caps which close off one end of each of the sleeves 20.

Lining strips of velvet or similar material are provided as indicated at 24 in the sleeves 20 and adjacent the inner surfaces of the plate 18 as well as the portions 21, the purpose thereof also being hereinafter more fully explained.

The aforementioned spool carrier 17 consists of a strap 25 provided at its ends with a pair of bearing blocks 26, each of the latter, in turn, carrying a rotatable shaft 27.

The strap 25 is adapted for removable positioning between the plate 18 and the plate portions 21, at the relatively opposite ends of the sleeves 20 with respect to the aforementioned plate 23. It should be understood that the mid-portions of the plate 23 and of the strap 25 are of substantially the same thickness and that when the strap 25 is in its position, the bearing blocks 26 will close off the adjacent ends of the sleeves 20. The plate 23 and the strap 25 are retained in position by the aforementioned screws 22.

A mounting plate 28 is secured to the plate 23 and the strap 25 by a plurality of further screws 29, the plate 28 being formed with a sight opening 30 which is aligned with the aforementioned sight opening 19 in the plate 18. The plate 28 also carries an annular flange 31, the same being secured thereto by suitable rivets 32 and being disposed concentrically with the opening 30. The flange 31 is employed for removably attaching the entire device to the objective 32 of the optical instrument with which the invention is used, as exemplified in the accompanying drawings by the photographic camera 33. A suitable set screw 34, provided with an elongated, knurled head 35, is provided in the flange 31 and by engaging the objective 32, removably retains the entire attachment in position.

It will be also noted that the plate 23 and the strap 25 are attached to the plate 18 by suitable screws 36, so that the plate and the strap are provided with the apertures 37, 38 and 39 to receive the aforementioned screws 22, 29 and 36 respectively, as is best shown in Figure 7.

It will be noted that the openings 19 and 30 are axially aligned with the objective 32, and that the outer surface of the plate 18 is formed or provided with an annular flange 40, as is best shown in Figures 1 and 4.

The flange 40 is secured to the plate 18 by a plurality of rivets 41, and the flange is internally threaded as at 42 to receive an externally threaded, annular retaining nut 43.

Referring now to the aforementioned spool carrier 17, the shafts 27 thereof are each provided with a pair of spaced flanges 44 which provide what may be referred to as a spool on each of the shafts. Each of the shafts also carries a knurled disc 45 and an externally manipulatable control knob 46, as will be clearly apparent from the accompanying drawings. When the carrier 17 is placed in position in the holder 16, the free end portions, that is, the inner end portions of the shafts 27 are rotatably receivable in suitable bores 48 provided in the plate 23, as is best shown in Figure 2.

A pair of resilient strips or fingers 49 are welded or otherwise suitably secured to the strap 25 and each of the fingers frictionally engages one of the aforementioned discs 45, whereby rotation of the shafts 27 will be effectively resisted.

The filter structure employed in the invention consists of a plurality of differently colored gelatine filters 50 to 56 inclusively, the same being more or less conventional type and being secured together in a strip-like formation, as is best shown in Figures 5 and 6. The strip of filters is designated collectively by the reference character 57, and it will be noted that the several filters are secured together by strips of transparent adhesive tape 58 extending transversely of their adjacent edges, and by longitudinally extending strips of similar tape 59, which are disposed at the marginal edge portions of the strip 57. The adhesive strips 58 and 59 are, of course, provided on both sides of the strip 57, and the end portions of the strips 57 terminate in transparent panels 60.

The strip 57, as a whole, is flexible so that it may be readily wound upon or unwound from the spools on the shafts 27. The end portions of the strip 57 are attached to the spools, more specifically, to the shafts 27, by being wrapped around the shafts as indicated at 61 in Figure 8, and reinforcing straps 62, formed from transparent adhesive tape, being, in turn, wrapped around the strip portions 61, as will be clearly apparent.

The strip 57 passes through the aforementioned lining strips 24 between the openings 19 and 30, and it will be noted that the lining strips 24 will effectively prevent dust and particles of foreign matter from entering into the sleeves 20.

When the invention is placed in use, the device, as a whole, is simply attached to the objective 32 as has been already explained, and the filter of appropriate color may be readily brought in position before the objective by simply rotating the knobs 46.

The knobs 46 should, of course, be rotated only in one direction, namely, in such direction that the strip 57 will be wound upon the spool associated with the knob being turned. The proper direction of rotation may, if desired, be inscribed upon the plate 18 adjacent each of the two knobs, as indicated at 63.

The aforementioned flange 40 may be employed for retaining additional filters of conventional design, if the use of such is deemed desirable. Such filter or filters may be readily positioned in the flange by simply removing the nut 43, which will subsequently retain the filter in position when the same has been installed.

It should, of course, be understood that the use of such auxiliary filter bears no connection with the structure of the instant invention, and that the flange 40, together with the associated nut 43, are provided merely in anticipation of the possible use of auxiliary filters.

To facilitate identification of the filter positioned between the openings 19 and 30, the strip 57 is inscribed with a plurality of markings 64, which represent the commercial designation of the adjacent filter. The plate 18 is provided with a window 65, and as the strip 57 is wound and unwound on the shaft 27, the markings 64 will appear in the window 65, so that the particular filter positioned at any time before the objective may be readily identified.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

An optical filter attachment comprising in combination, a plate adapted for removable mounting upon the objective and provided with a sight opening aligned with said objective, a pair of sleeves provided on said plate at the relatively opposite sides of said opening, a spool rotatably mounted in each of said sleeves, a knurled disc and an externally manipulatable control knob rotatable with each of said spools, a flexible strip windable on said spools, said strip comprising a row of differently colored filters and transparent adhesive tape for securing the same together, said filters being selectively registerable with said opening upon the rotation of said knobs, a pair of resilient fingers each frictionally engaging one of said discs, means for identifying said filters comprising a window in said plate and indicia on said flexible strip, and lining strips carried by said sleeves and plate on both sides of said flexible strip to prevent entrance of dust into said sleeves.

NORMAN A. KATH.

REFERENCES CITED

The following references are of record in the file of this patent:

UNITED STATES PATENTS

| Number | Name | Date |
|---|---|---|
| 599,670 | Harrison | Feb. 22, 1908 |

FOREIGN PATENTS

| Number | Country | Date |
|---|---|---|
| 23,658 | Great Britain | 1903 |
| 11,765 | Great Britain | 1905 |
| 515,276 | Germany | June 12, 1931 |
| 581,272 | Germany | July 24, 1933 |